United States Patent
Ishihara et al.

(10) Patent No.: US 7,468,762 B2
(45) Date of Patent: Dec. 23, 2008

(54) DIGITAL/ANALOG TV RECEIVER

(75) Inventors: Kazuhide Ishihara, Daito (JP); Takahiro Katayama, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1459 days.

(21) Appl. No.: 10/347,487

(22) Filed: Jan. 21, 2003

(65) Prior Publication Data

US 2003/0151698 A1 Aug. 14, 2003

(30) Foreign Application Priority Data

Jan. 18, 2002 (JP) ............................. 2002-009404

(51) Int. Cl.
H04N 5/50 (2006.01)
(52) U.S. Cl. .......................... 348/732; 348/731; 725/38
(58) Field of Classification Search ......... 348/731–733, 348/734, 553, 554; 725/38
See application file for complete search history.

(56) References Cited

U.S. PATENT DOCUMENTS

| 6,721,018 | B1 * | 4/2004 | Shintani et al. ............. 348/731 |
| 6,924,848 | B2 * | 8/2005 | Onomatsu .................... 725/38 |
| 2006/0038926 | A1 * | 2/2006 | Mayer et al. ................ 348/731 |

FOREIGN PATENT DOCUMENTS

JP 10-233970 9/1998
JP 2000-312134 11/2000

* cited by examiner

Primary Examiner—M. Lee
(74) Attorney, Agent, or Firm—Crowell & Moring LLP

(57) ABSTRACT

A digital/analog TV receiver is provided comprising a broadcasting signal receiver for receiving broadcasting signals of both ground wave and cable wave, a main controller which carries out the process of full-range scanning including a transmission route examining step of automatically specifying the transmission route of a broadcasting signal and a channel examining step of automatically specifying the channel of the broadcasting signal received from the transmission route, and a memory for holding a channel map where the channel of each broadcasting signal is stored. The main controller can carry out the transmission route examining step to check the receipt of the ground wave broadcasting signal of a digital form by the broadcasting signal receiver and automatically examine from the result of the checking whether the broadcasting signal is received from the ground wave transmission route or the cable wave transmission route. Also, the main controller can check the receipt of the broadcasting signal from the transmission route by the broadcasting signal receiver and automatically specify from the result of the checking the channel of the broadcasting signal received from the transmission route. The channel of the broadcasting signal is then stored into the channel map of the memory by the main controller.

13 Claims, 9 Drawing Sheets

70a

| GROUND WAVE DIGITAL | |
|---|---|
| 2 | 12.268GHz |
| 3 | 12.288GHz |
| 4 | 12.308GHz |
| 5 | ... |
| . | . |
| . | . |
| . | . |
| . | . |
| 98 | ... |
| 99 | ... |

72a  71a

70b

| GROUND WAVE ANALOG | |
|---|---|
| 2 | 55.25MHz |
| 3 | 61.25MHz |
| 4 | 67.25MHz |
| 5 | ... |
| . | . |
| . | . |
| . | . |
| . | . |
| 98 | ... |
| 99 | ... |

72b  71b

70c

| CABLE WAVE ANALOG | |
|---|---|
| 2 | 250.25MHz |
| 3 | 256.25MHz |
| 4 | 261.25MHz |
| 5 | ... |
| . | . |
| . | . |
| . | . |
| . | . |
| . | . |
| . | . |
| . | . |
| . | . |
| . | . |
| 127 | ... |
| 128 | ... |

72c  71c

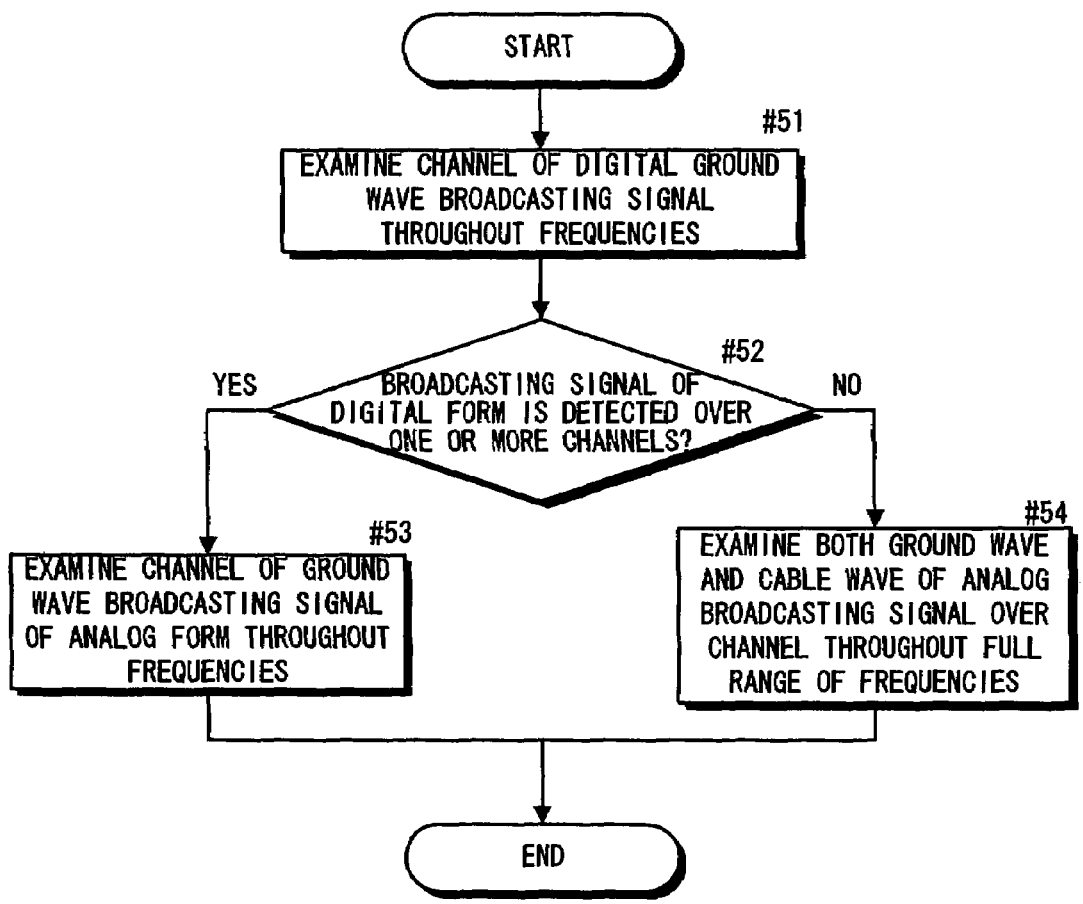

DIGITAL/ANALOG TV RECEIVER

BACKGROUND OF THE INVENTION

1. Field of the Invention

The present invention relates to a digital/analog TV receiver which has a full-range scanning function for automatically identifying the transmission route of a broadcasting signal and automatically specifying the channel of the broadcasting signal as a receivable channel.

2. Description of the Related Art

The transmission route of television broadcasting signals is commonly classified into ground wave route and cable wave route. There are some TV receivers which can receive broadcasting signals from both the ground wave transmission route and the cable wave transmission route. When the frequency is different between the ground wave signal and the cable wave signal, the apparatus itself has to identify the transmission route of the broadcasting signal. Hence, a type of TV receiver is known which has a full-range scanning function for detecting the broadcasting signal received from a station, automatically identifying the transmission route of the broadcasting signal, and automatically specifying the channel of each receivable broadcasting signal.

The process of full-range scanning in the conventional TV receiver includes steps of examining alternately the presence of both ground wave and cable wave of the broadcasting signal throughout the full range of frequencies of the channels and determining from the result of the examination whether the broadcasting signal is received from the ground wave transmission route or the cable wave transmission route. After the transmission route of the broadcasting signal is determined, the presence of the broadcasting signal is examined throughout the frequencies to determine the receivable channels.

Meanwhile, a method of examining whether the broadcasting signal is a ground television broadcasting signal or a cable television signal is known including steps of examining the presence of broadcasting signals over a group of channels which are identical in the frequency and the channel number and determining from the result of the examination whether the broadcasting signal received by the receiver is a ground television broadcasting signal or a CATV signal (for example, as disclosed in Japanese Patent Laid-open Publication No. HEI 10-233970). Also, a method of specifying the channel of a received signal in a digital broadcast receiver is known where the number of PSK lock detecting actions for all the channels and the number of frame synchronization detecting actions for the channels in a particular frequency range are minimized for readily specifying the channel of a received signal in the range of broadcast frequencies (for example, as disclosed in Japanese Patent Laid-open Publication No. 2000-312134).

It is however needed for specifying the transmission route of a broadcasting signal through full-range scanning in any conventional broadcasting signal receiver to detect the presence of the broadcasting signal over two or more channels. Accordingly, the step of specifying the transmission route of the broadcasting signal will consume a considerable length of time thus increasing the overall duration of the full-range scanning process.

So far in 2001, the ground television signals of the U.S.A. broadcast system are provided in both analog and digital forms while the cable television signals are provided mainly in an analog form. It is hence desired to develop an improved TV receiver which is capable of receiving both a ground wave and a cable wave of the broadcasting signal and both an analog form and a digital form of the ground wave signal while is increased in the speed of full-range scanning process. This requirement will hardly be achieved by the teachings of the above Publication Nos. HEI 10-233970 and 2000-312134.

SUMMARY OF THE INVENTION

The present invention has been developed for achieving the above requirement and its object is to provide a digital/analog TV receiver arranged for carrying out the process of full-range scanning at a short length of time while capable of receiving both a ground wave and a cable wave of the broadcasting signal and both an analog form and a digital form of the ground wave signal.

An aspect of the present invention provides a digital/analog TV receiver having a broadcasting signal receiver for receiving broadcasting signals of both ground wave and cable wave which are transmitted at corresponding frequencies assigned to a given broadcast service channel and a decoder for reconstructing an image signal from the image data in the broadcasting signal received by the broadcasting signal receiver for displaying images of the image signal on a display connected to the digital/analog TV receiver whereby a process of full-range scanning over a channel signal can be performed at high speed, comprising: a controller which carries out the process of full-range scanning including a transmission route examining step of detecting a receipt of a broadcasting signal of the ground wave by the broadcasting signal receiver and automatically judging from a result of the detection whether the broadcasting signal is received from a ground wave transmission route or a cable wave transmission route and a channel examining step of detecting at which frequency assigned to a channel the broadcasting signal is received by the broadcasting signal receiver from the transmission route determined at the transmission route examining step and automatically specifying from a result of the detection the channel of the broadcasting signal received from the transmission route; and a memory for holding a channel map where the channel of each broadcasting signal specified by the full-range scanning process of the controller is stored.

According to the present invention, the process of full-range scanning involves attempting to receive a digital broadcasting signal, automatically examining from the result of the receipt whether the broadcasting signal is received from a ground wave transmission route or a cable wave transmission route, and automatically specifying the channel of the broadcasting signal received from the transmission route. The channel of the broadcasting signal is then registered and stored as a receivable channel in the channel map. As the transmission route from which the broadcasting signal is received is determined from the receipt of the digital signal in the ground wave signals, the action of determining the transmission route and specifying the channel of the broadcasting signal can efficiently be carried out thus minimizing the overall duration of the full-range scanning process.

BRIEF DESCRIPTION OF THE DRAWINGS

FIG. 10 is a flowchart showing the procedure of full-range scanning in a still further embodiment of the present invention.

DETAILED DESCRIPTION OF THE EMBODIMENTS

Figure 1:
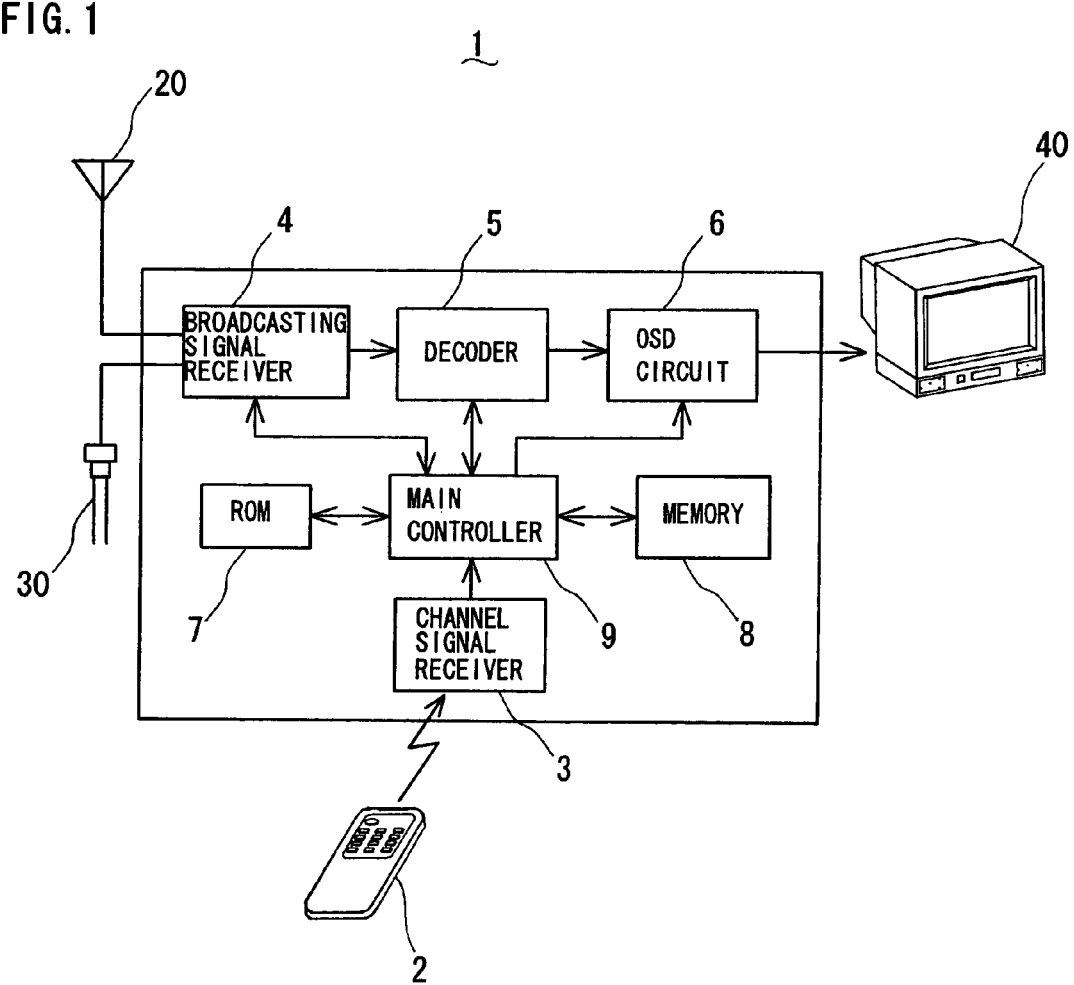
FIG. 1 is an electrical block diagram of a digital/analog TV receiver showing one embodiment of the present invention.

Some embodiments of the present invention will be described referring to the relevant drawings. FIG. 1 is an electrical block diagram of a digital/analog TV receiver showing the first embodiment of the present invention. The digital/analog TV receiver 1 is connected to an antenna 20 for intercepting a television signal of ground wave, a cable 30 for receiving a television signal of cable wave, and a display 40 for displaying images of the television signals.

The TV receiver 1 is provided for receiving both digital and analog forms of the television signal via the antenna 20 from a broadcasting service station or an analog form of the cable wave television signal via the cable 30 and reproducing images of the television signals on the display 40. The TV receiver 1 has a full-range scanning function for examining whether the television signal is received from a ground wave transmission route or a cable wave transmission route and automatically determining a range of broadcast channels which can be intercepted.

The TV receiver 1 substantially comprises a channel changer 2, a channel signal receiver 3, a broadcasting signal receiver 4, a decoder 5, an OSD (on-screen display) circuit 6, a ROM 7, a memory 8, and a main controller 9.

The channel changer 2 is operated by a user for selection of a desired television channel, scanning of the full range, and controlling the actions of the TV receiver I through emitting corresponding radio command signals such as infrared ray signals. The channel signal receiver 3 receives the command signals from the channel changer 2 and transmits corresponding signals to the main controller 9.

The broadcasting signal receiver 4 tunes the frequency of the desired channel received from the main controller 9 for selecting the television signal of the channel. The decoder 5 demodulates and decodes the television signal selected by the broadcasting signal receiver 4 to reproduce an image signal for displaying the image on the display 40. The image signal is transferred from the decoder 5 via the OSD circuit 6 to the display 40. When receiving the ground wave broadcasting signal of a digital form, the decoder 5 also extracts a channel data known as VCT (virtual channel table) and an electronic program data known as EIT (event information table) from the ground wave broadcasting signal of a digital form for output to the main controller 9.

The OSD circuit 6 superimposes a particular on-screen display data on the image signal received from the decoder 5. This allows the display 40 to display the on-screen display data on the television broadcast image.

Figure 2A:
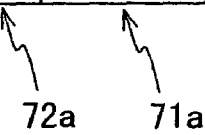
FIG. 2 is a schematic illustration explaining frequency tables in the TV receiver.
Figure 2B:
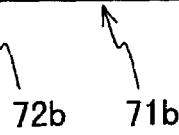
Figure 2C:

The ROM 7 includes frequency tables, such as shown at 70a, 70b, and 70c in FIGS. 2a, 2b, and 2c respectively, where all the frequencies of the broadcasting signals for full-range scanning are assigned to the broadcast channels. For example, in U.S.A., the ground wave broadcasting signals of both digital and analog forms are assigned to 2 to 99 of the channel numbers while the cable wave broadcasting signals of an analog form are assigned to 2 to 128 of the channel numbers.

The frequency table 70a illustrates the relationship between the frequency and the channel of the ground wave broadcasting signal of a digital form. The frequencies of the broadcasting signal are stored in a frequencies storage area 71a and their assigned channel numbers are stored in a channel number storage area 72a. The frequency table 70b illustrates the relationship between the frequency and the channel of the ground wave broadcasting signal of an analog form. The frequency table 70c illustrates the relationship between the frequency and the channel of the cable wave broadcasting signal of an analog form. Similar to the frequency table 70a, the frequencies of the broadcasting signal are stored in frequencies storage areas 71b and 71c and their assigned channel numbers are stored in channel number storage areas 72b and 72c of their respective frequency tables 70b and 70c.

While all the applicable frequencies of the broadcasting signal are assigned to the channels in consideration of a future increase in the number of broadcast stations to which corresponding frequencies of the broadcasting signal are separately assigned, some remain not officially granted but assigned to the channel numbers. As both the digital and analog forms of the ground wave broadcasting signal from each single station are assigned to one channel, one of them can be distributed at one time over the channel.

Figure 3:
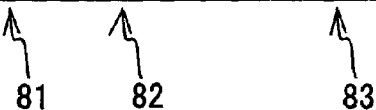
FIG. 3 is a schematic illustration explaining a channel map in the TV receiver.

The memory 8 includes, as shown in FIG. 3, a channel map 80 for storing each channel of the broadcasting signal detected through full-range scanning, the type of the broadcasting signal, and the frequency of the broadcasting signal. The channel map 80 consists mainly of a channel number storage area 81 for storing the channel number, a frequencies storage area 82 for storing the frequencies, and a signal type storage area 83 for storing the types of the broadcasting signal. The main controller 9 controls the action of the above described components for carrying out the selection of a desired television channel, the full-range scanning, and other relevant operations in response to the commands from the channel changer 2.

Figure 4A:
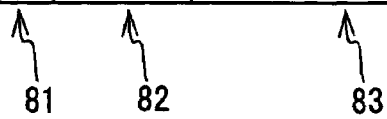
FIGS. 4a and 4b illustrate examples of the channel map when the broadcasting signal is received from the ground wave transmission route and the cable wave transmission route respectively.
Figure 4B:
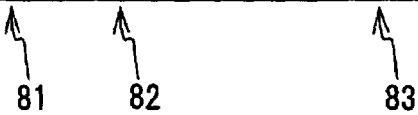

Upon receiving a command of full-range scanning from the channel changer 2, the main controller 9 performs the action of full-range scanning. More particularly, the main controller 9 examines the transmission path of broadcasting signals, determines the channels receivable along the transmission path, and saves the channel number, the frequency, and the type of each broadcasting signal in the channel map 80 of the memory 8. As the full-range scanning has been completed, the channel map 80 carries the channel number, the frequency, and the type of each broadcasting signal to be received in the channel number storage area 81, the frequencies storage area 82, and the signal type storage area 83 respectively, as shown in FIGS. 4a and 4b. FIG. 4a illustrates an example of the channel map 80 where the broadcasting signal received through the transmission route is a ground wave broadcasting signal. FIG. 4b illustrates another example of the channel map 80 where the broadcasting signal to be received is a cable wave broadcasting signal. The full-range scanning will be explained later in more detail.

In response to the selection of a desired channel by the channel changer 2, the main controller 9 adjusts the broadcasting signal receiver 4 to the frequency of the broadcasting signal of the channel which is stored in and read from the memory 8. As the result, the broadcasting signal of the channel selected by the channel changer 2 is received by the broadcasting signal receiver 4 and demodulated and decoded by the decoder 5 and its reproduction is displayed as a television program on the display 40.

Also when receiving a command from the channel changer 2 for displaying an EPG (Electric Program Guide) image which carries a list of television programs, the main controller 9 reads a list of the receivable channels from the channel map 80 of the memory 8 and constructs the EPG image in conjunction with VCT and EIT data from the decoder 5. The EPG image is then transmitted as an image signal to the OSD circuit 6. Accordingly, the EPG image carrying the list of television programs can be displayed on the display 40.

Figure 5:
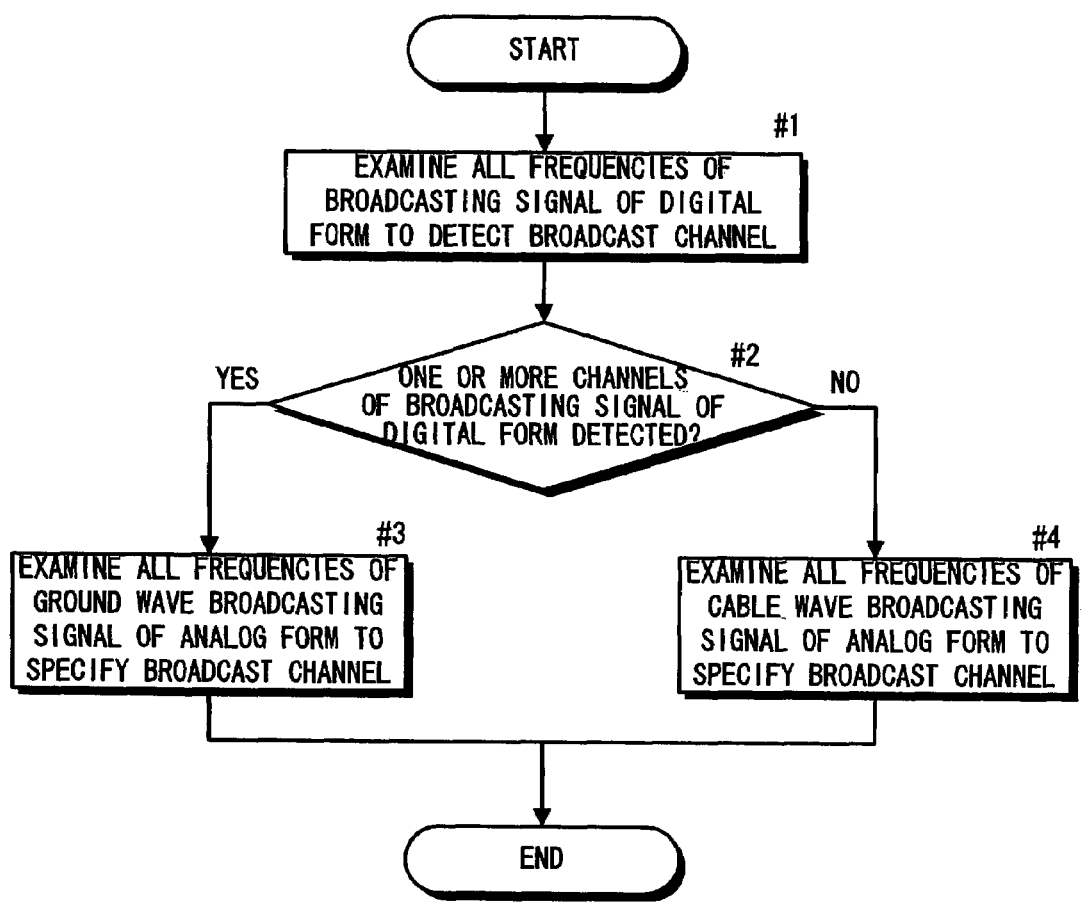
FIG. 5 is a flowchart showing the procedure of full-range scanning of the TV receiver.
Figure 6:
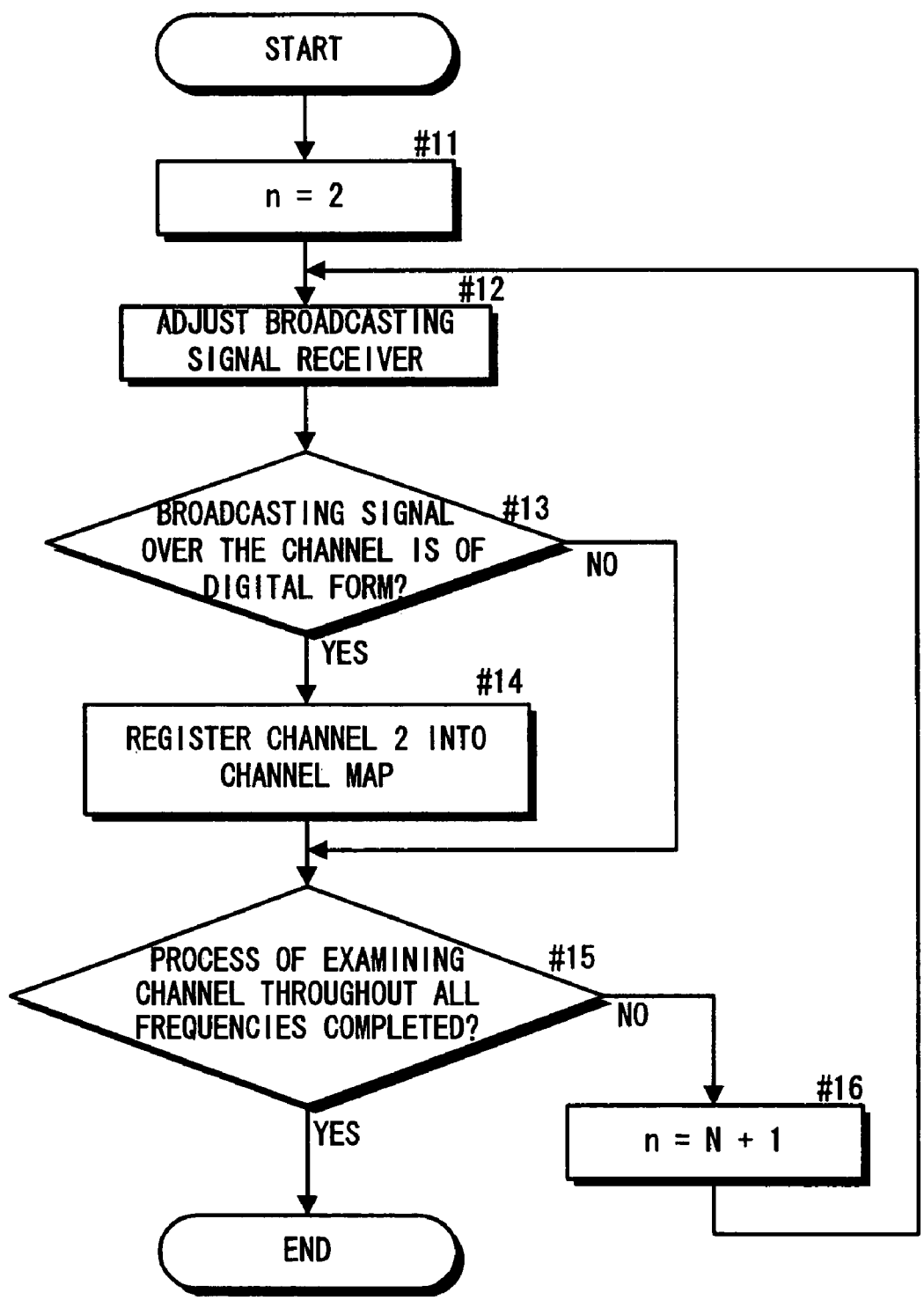
FIG. 6 is a flowchart showing the procedure of full-range scanning of the TV receiver.
Figure 7:
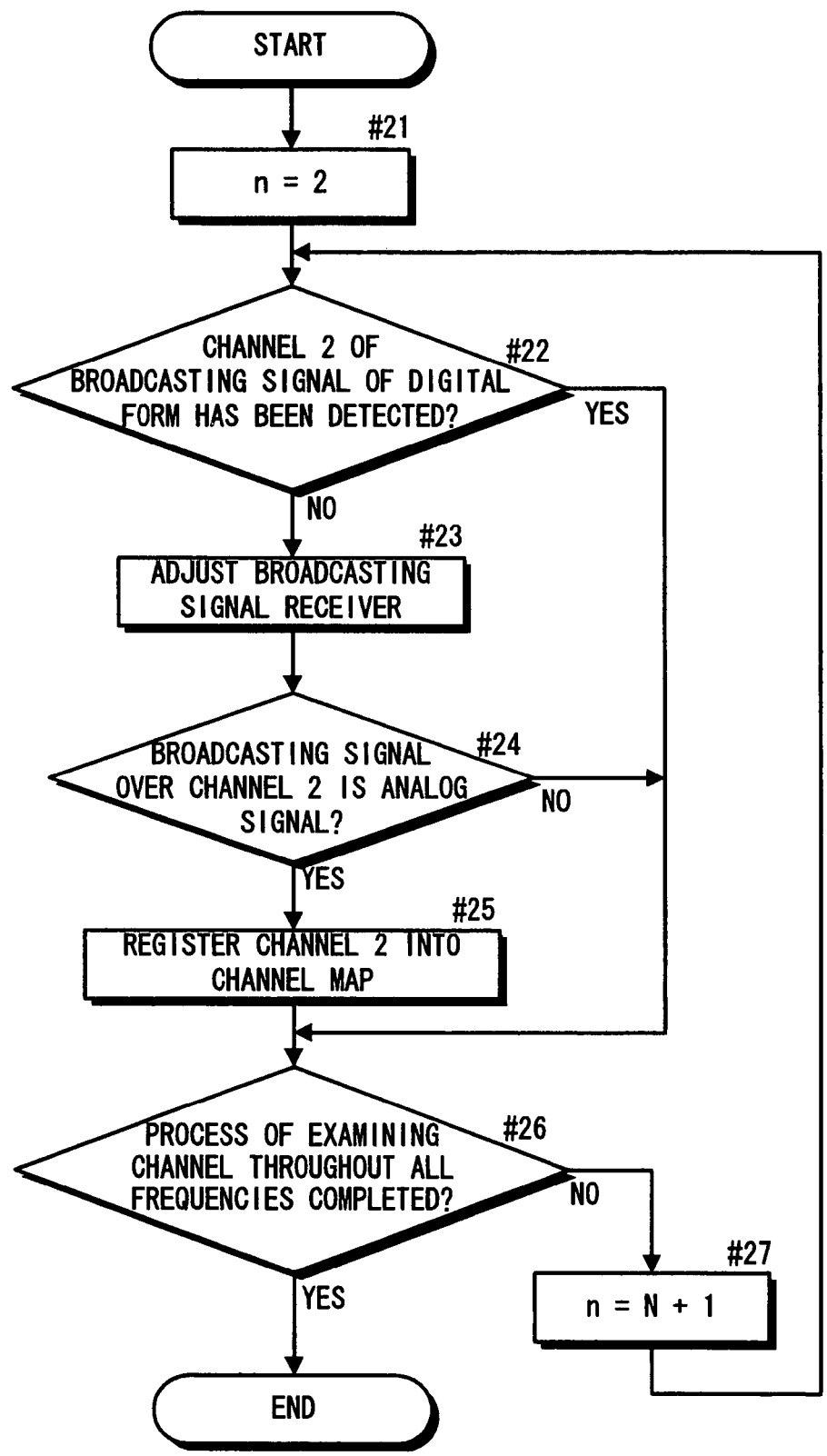
FIG. 7 is a flowchart showing the procedure of full-range scanning of the TV receiver.

The action of full-range scanning in the digital/analog TV receiver 1 of this embodiment will now be described referring to flowcharts shown in FIGS. 5 to 7. The action starts with the main controller 9 examining all the frequencies of the broadcasting signal of a digital form to detect the broadcast channel (Step #1). Then, the main controller 9 carries out a process of examining the broadcasting signal to identify its transmission route and then a process of specifying the channel of the broadcasting signal throughout the full range of frequencies over the transmission route. More specifically, when one or more channels of the broadcasting signal of a digital form are detected from the process of determining the channel of the broadcasting signal at Step #1 (Yes at Step #2), the main controller 9 judges that the broadcasting signal is a ground wave broadcasting signal and then starts a process of examining all the frequencies of the ground wave broadcasting signal of an analog form to specify the broadcast channel (Step #3). When no channel of the broadcasting signal of a digital form is detected (No at Step #2), the main controller 9 judges that the broadcasting signal is received from the cable wave transmission route and starts a process of examining all the frequencies of the cable wave broadcasting signal to specify the broadcast channel (Step #4).

The process of examining all the frequencies of the broadcasting signal of a digital form to specify the broadcast channel at Step #1 will be explained in more detail referring to a flowchart of FIG. 6. The main controller 9 identifies the channel number as n=2 (Step #11) and adjusts the broadcasting signal receiver 4 to the frequency of the broadcasting signal over the channel 2 which is stored in and read from the frequency table 70a of the ROM 7 (Step #12).

When the main controller 9 determines from the output of the decoder 5 that the broadcasting signal over the channel 2 is of a digital form (Yes at Step #13), it registers a combination of the channel 2, the frequency, and the type of the broadcasting signal, indicating a digital form of the broadcasting signal, into the channel map 80 of the memory 8 (Step #14).

When the process of examining the channel throughout all the frequencies of the broadcasting signal of a digital form is not completed (No at Step #15), the main controller 9 increases the channel number by one (Step #16) and repeats the procedure from Step #12. When the process of examining the channel throughout all the frequencies is completed (Yes at Step #15), the main controller 9 cancels the process of examining the channel of the broadcasting signal of a digital form. When the broadcasting signal of a digital form is identified as a ground wave broadcasting signal received from the ground wave transmission route by the foregoing process, its channel number, frequency, and type are stored in a combination in the channel map 80 of the memory 8. When the broadcasting signal is a cable wave broadcasting signal from the cable wave transmission route, the broadcasting signal of a digital form is not detected at Step #13 and thus no channel of the broadcasting signal of a digital form is stored in the channel map 80 of the memory 8.

Similarly, the process of examining all the frequencies of the broadcasting signal of an analog form to specify the broadcast channel at Step #3 will be explained in more detail referring to a flowchart of FIG. 7. The main controller 9 identifies the channel number as n=2 (Step #21) and examines whether or not the channel 2 of the broadcasting signal of a digital form has been detected (Step #22). When the channel 2 of the broadcasting signal of a digital form has not been detected (No at Step #22), the main controller 9 adjusts the broadcasting signal receiver 4 to the frequency of the broadcasting signal over the channel 2 which is stored in and read from the frequency table 70b of the ROM 7 (Step #23).

When the main controller 9 determines from the output of the decoder 5 that the broadcasting signal over the channel 2 is an analog signal (Yes at Step #24), it registers a combination of the channel 2, the frequency, and the type of the broadcasting signal, indicating an analog form of the broadcasting signal, into the channel map 80 of the memory 8 (Step #25).

When the process of examining the channel throughout all the frequencies of the broadcasting signal of an analog form is not completed (No at Step #26), the main controller 9 increases the channel number by one (Step #27) and repeats the procedure from Step #22. When the process of examining the channel throughout all the frequencies is completed (Yes at Step #26), the main controller 9 cancels the process of examining the channel of the broadcasting signal of an analog form. Through the process of examining the channel of the broadcasting signal of an analog form, the channel number, the frequency, and the type of each analog broadcasting signal are stored in a combination in the channel map 80 of the memory 8.

The process of examining all the frequencies of the analog broadcasting signal of cable wave at Step #4 will be explained in more detail. The process starts with the main controller 9 carrying out the same process as of the ground wave broadcasting signal of a digital form throughout the frequencies of the cable television signal stored in the frequency table 70c of the ROM 7. Accordingly through the process of examining the channel of the analog broadcasting signal of cable wave, the channel number, the frequency, and the type of each analog cable wave broadcasting signal are stored in a combination in the channel map 80 of the memory 8.

The process of full-range scanning allows the ground wave broadcasting signal of both digital and analog forms to be registered and stored its channel number, frequency, and type in a combination in the channel map 80 of the memory 8, as shown in FIG. 4a. Also, the process of full-range scanning allows the cable wave broadcasting signal of an analog form to be registered and stored its channel number, frequency, and type in a combination in the channel map 80 of the memory 8, as shown in FIG. 4b. The channel number, the frequency, and the type of each signal can be utilized for selection of a desired channel and display of an EPG image.

Another digital/analog TV receiver according to a second embodiment of the present invention will now be described. The process of full-range scanning in this embodiment can eliminate the step of examining the channel of a ground wave broadcasting signal of an analog form determined from the VCT data in the ground wave broadcasting signal of a digital form at the digital ground wave broadcasting signal channel examining step throughout the full range of frequencies. The other arrangement is identical to that of the previous embodiment.

Figure 8:
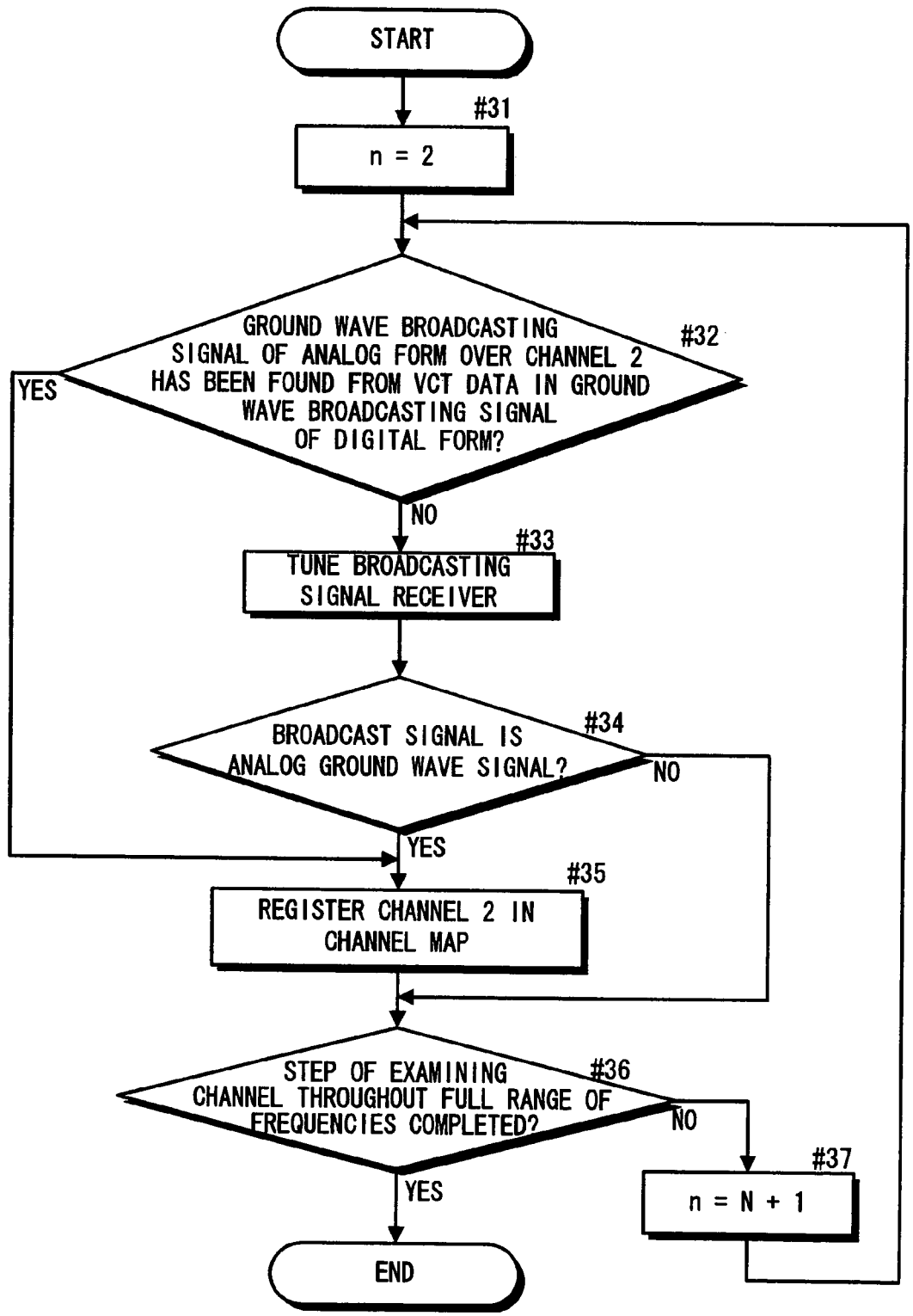
FIG. 8 is a flowchart showing the procedure of full-range scanning in another embodiment of the present invention.

The step of examining the channel of the ground wave broadcasting signal of an analog form throughout the full range of frequencies in the full-range scanning will be described referring to a flowchart of FIG. 8. The process starts with the main controller 9 identifying the channel as n=2 (Step #31) and examining whether or not the ground wave broadcasting signal of an analog form over the channel 2 has been found from the VCT data in the ground wave broadcasting signal of a digital form (Step #32).

When so (Yes at Step #32), the channel number 2 of the ground wave broadcasting signal of an analog form is registered and stored by the main controller 9 together with the frequency and the type indicating an analog ground wave signal in the channel map 80 of the memory 8 (Step #35). If not (at Step #32), the main controller 9 tunes the broadcasting signal receiver 4 with the frequency of the channel 2 which is determined by the frequency table 70b in the ROM 7 (Step #33). When it is judged by the main controller 9 from the output of the decoder 5 that the broadcasting signal is an analog ground wave signal (Yes at Step #34), the channel 2 of the analog ground wave broadcasting signal is specified and registered as stored together with the frequency and the type in the channel map 80 of the memory 8 (Step #35).

If the step of examining the channel throughout the full range of frequencies is not completed (No at Step #36), the channel number is increased by one (Step #37) and the procedure from Step #32 is repeated. When the step of examining the channel throughout the frequencies is completed (Yes at Step #36), the analog ground wave broadcasting signal channel examining step ends up.

A further digital/analog TV receiver according to a third embodiment of the present invention will now be described. The process of full-range scanning in this embodiment can eliminate the step of examining the channel of a ground wave broadcasting signal of an analog form specified at the digital ground wave broadcasting signal channel examining step throughout the full range of frequencies. It can also eliminate the step of examining the channel of a ground wave broadcasting signal of an analog form determined from the VCT data in the ground wave broadcasting signal of a digital form at the digital ground wave broadcasting signal channel examining step. The other arrangement is identical to that of the previous embodiment.

Figure 9:
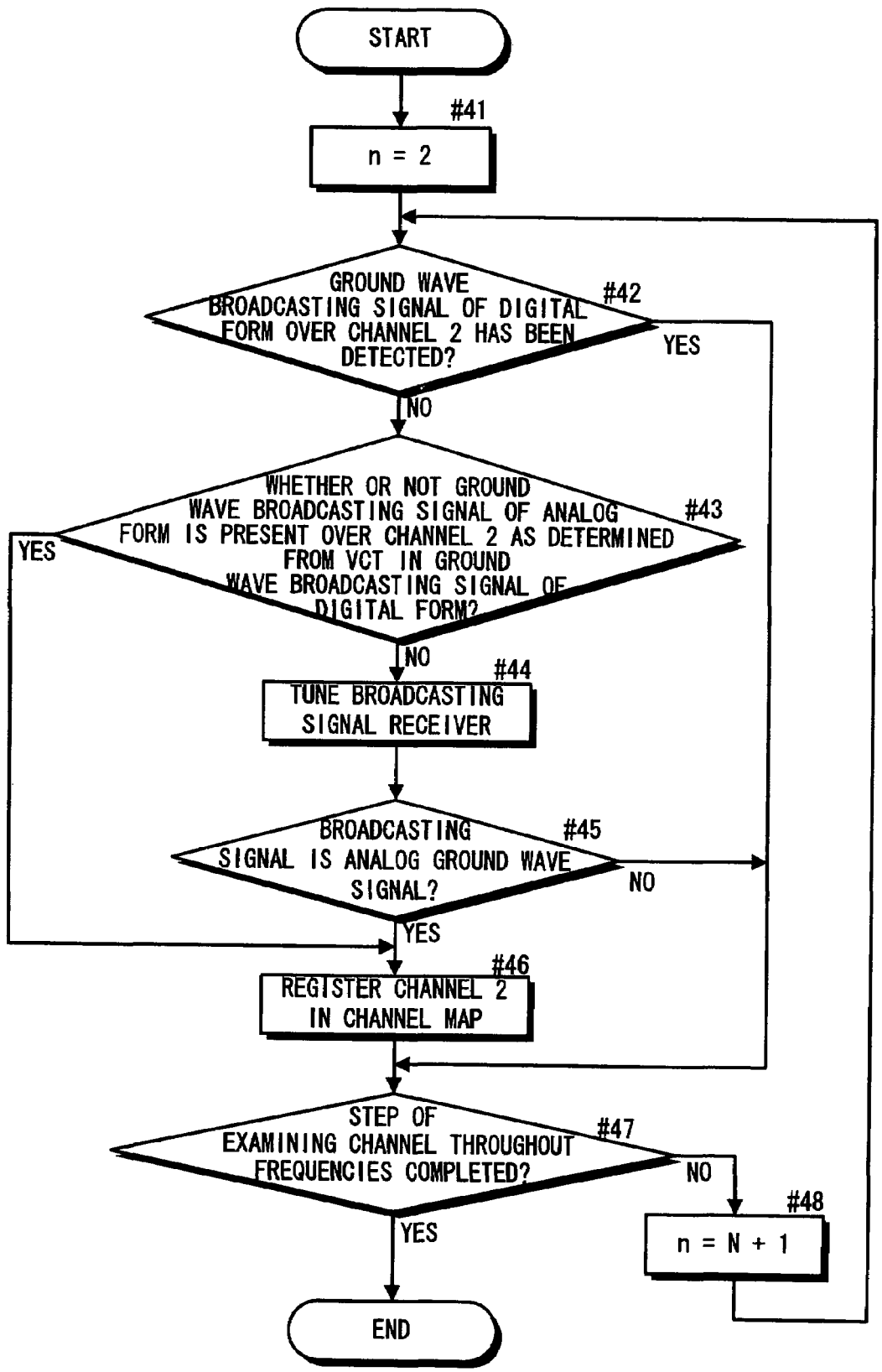
FIG. 9 is a flowchart showing the procedure of full-range scanning in a further embodiment of the present invention.

The step of examining the channel of the ground wave broadcasting signal of an analog form throughout the full range of frequencies in the full-range scanning will be described referring to a flowchart of FIG. 9. The procedure starts with the main controller 9 identifying the channel as n=2 (Step #41) and examining whether the ground wave broadcasting signal of a digital form over the channel 2 has been detected or not (Step #42). When the digital ground wave broadcasting signal is not detected (No at Step #42), it is then examined whether or not the ground wave broadcasting signal of an analog form is present over the channel 2 as determined from the VCT in the ground wave broadcasting signal of a digital form (Step #43).

When the ground wave broadcasting signal of an analog form has been detected (Yes at Step #43), its channel number 2 is registered and stored by the main controller 9 together with the frequency and the type indicating an analog ground wave signal in the channel map 80 of the memory 8 (Step #46). If not at Step #43, the main controller 9 tunes the broadcasting signal receiver 4 with the frequency of the channel 2 which is determined by the frequency table 70b in the ROM 7 (Step #44). When it is judged by the main controller 9 from the output of the decoder 5 that the broadcasting signal is an analog ground wave signal (Yes at Step #45), the channel 2 of the analog ground wave broadcasting signal is specified and registered as stored together with the frequency and the type in the channel map 80 of the memory 8 (Step #46).

If the step of examining the channel throughout the full range of frequencies is not completed (No at Step #47), the channel number is increased by one (Step #48) and the procedure from Step #42 is repeated. When the step of examining the channel throughout the frequencies is completed (Yes at Step #47), the analog ground wave broadcasting signal channel examining step ends up.

A still further digital/analog TV receiver according to a fourth embodiment of the present invention will now be described. The process of full-range scanning in this embodiment allows the analog broadcasting signals of both ground wave and cable wave to be alternately examined for the channel number throughout the full range of frequencies when the ground wave broadcasting signal of a digital form is received over no channel. It is then examined from the receipt of the broadcasting signal whether the broadcasting signal is a ground wave signal or a cable wave signal. The channel of the broadcasting signal from the detected transmission route can thus be specified throughout the full range of frequencies. The other arrangement is identical to that of the previous embodiment.

The process of full-range scanning in this embodiment will be described referring to a flowchart of FIG. 10. The process starts with the main controller 9 examining the channel of a digital ground wave broadcasting signal throughout the frequencies (Step #51).

When the digital ground wave broadcasting signal is detected over no channel (No at Step #52), the main controller 9 examines both ground wave and cable wave of the analog broadcasting signal over the channel throughout the full range of frequencies (Step #54). It is then examined on the way whether the broadcasting signal is received from the ground wave transmission route or the cable wave transmission route. The channel of each broadcasting signal received from the detected transmission route is then examined throughout the frequencies.

When the broadcasting signal of a digital form is detected over one or more channels (Yes at Step #52), the main controller 9 judges that the broadcasting signal is received from the ground wave transmission route and then examines the channel of the ground wave broadcasting signal of an analog form throughout the frequencies (Step #53).

The present invention is not limited to the foregoing embodiments but other modifications may be made. For example, the TV receiver 1 may be equipped with an operating switch which is turned on by the user for carrying out the process of full-range scanning. This application has a priority right over the previous application filed on Jan. 18, 2002. The teachings of the previous application are included as a reference in this application.

What is claimed is:

1. A digital/analog TV receiver having a broadcasting signal receiver for receiving broadcasting signals of both ground wave and cable wave which are transmitted at corresponding frequencies assigned to a given broadcast service channel and a decoder for reconstructing an image signal from image data in the broadcasting signal received by the broadcasting signal receiver for displaying images of the image signal on a display connected to the digital/analog TV receiver whereby a process of full-range scanning over a channel signal can be performed at high speed, comprising:

a controller which carries out the process of full-range scanning to automatically specify the channel of the broadcasting signal, the process including a transmission route examining step of detecting a receipt of a digital broadcasting signal of the ground wave by the broadcasting signal receiver and automatically judging from a result of the detection whether the broadcasting signal is received from a ground wave transmission route or a cable wave transmission route and a channel examining step of detecting a receipt of the broadcasting signal from the transmission route determined at the transmission route examining step and automatically specifying from a result of the detection the channel of the broadcasting signal received from the transmission route; and a memory for holding a channel map where the channel of each broadcasting signal specified by the full-range scanning process of the controller is stored.

2. A digital/analog TV receiver arranged in which the process of full-range scanning over the channel signal can be performed at high speed according to claim 1, wherein the controller is adapted for carrying out the transmission route examining step to determine either:

that the broadcasting signal is received from the ground wave transmission route when the broadcasting signal of a digital form is carried over one or more channels; or that the broadcasting signal is received from the cable wave transmission route when the broadcasting signal of a digital form is carried over no channel.

3. A digital/analog TV receiver arranged in which the process of full-range scanning over the channel signal can be performed at high speed according to claim 2, wherein the controller is adapted for when it is judged at the transmission route examining step that the broadcasting signal is received from the ground wave transmission route, carrying out the channel examining step which includes:

a ground wave digital broadcast channel examining step of examining at which frequency in the full range the digital broadcasting signal of the ground wave is received by the broadcasting signal receiver and automatically specifying from a result of the examination the channel of the digital broadcasting signal; and a ground wave analog broadcast channel examining step of examining at which frequency in the full range an analog broadcasting signal of the ground wave is received by the broadcasting signal receiver and automatically specifying from a result of the examination the channel of the analog broadcasting signal.

4. A digital/analog TV receiver arranged in which the process of full-range scanning over the channel signal can be performed at high speed according to claim 3, wherein the control unit is adapted for skipping the ground wave analog broadcast channel examining step for the channel of the broadcasting signal which has been specified of a digital form in the ground wave digital broadcast channel examining step.

5. A digital/analog TV receiver arranged in which the process of full-range scanning over the channel signal can be performed at high speed according to claim 3, wherein the controller is adapted for carrying out a step of picking up data of the channel of the ground wave broadcasting signal of an analog form from a VCT (virtual channel table) carried in the ground wave digital broadcasting signal during the ground wave digital broadcast channel examining step, and skipping the ground wave analog broadcast channel examining step for the channel of the broadcasting signal of an analog form of which the data has been picked up from the VCT carried in the ground wave digital broadcasting signal during the ground wave digital broadcast channel examining step.

6. A digital/analog TV receiver arranged in which the process of full-range scanning over the channel signal can be performed at high speed according to claim 3, wherein the controller is adapted for carrying out a step of picking up data of the channel of the ground wave broadcasting signal of an analog form from a VCT carried in the ground wave digital broadcasting signal during the ground wave digital broadcast channel examining step, and skipping the ground wave analog broadcast channel examining step for the channel of the broadcasting signal of a digital form which has been specified at the ground wave digital broadcast channel examining step and for the channel of the ground wave broadcasting signal of an analog form of which the data has been picked up from the VCT carried in the ground wave digital broadcasting signal during the ground wave digital broadcast channel examining step.

7. A digital/analog TV receiver arranged in which the process of full-range scanning over the channel signal can be performed at high speed according to claim 2, wherein the controller is adapted for when it is judged at the transmission route examining step that the broadcasting signal is received from the cable wave transmission route, carrying out the channel examining step to examine at which frequency in the full range an analog broadcasting signal of the cable wave is received by the broadcasting signal receiver and automatically specify from a result of the examination the channel of the cable wave analog broadcasting signal.

8. A digital/analog TV receiver arranged in which the process of full-range scanning over the channel signal can be performed at high speed according to claim 1, wherein the controller is adapted for carrying out the transmission route examining step to determine that the broadcasting signal is received from the ground wave transmission route when the broadcasting signal of a digital form is carried over one or more channels or checking a receipt of both the ground wave broadcasting signal and the cable wave broadcasting signal of an analog form by the broadcasting signal receiver when the broadcasting signal of a digital form is carried over no channel and determining from a result of the checking whether the broadcasting signal is received from the ground wave transmission route or the cable wave transmission route.

9. A digital/analog TV receiver arranged in which the process of full-range scanning over the channel signal can be performed at high speed according to claim 8, wherein the controller is adapted for when it is judged at the transmission route examining step that the broadcasting signal is received from the ground wave transmission route, carrying out the channel examining step to examine at which frequency in the full range the ground wave broadcasting signal of a digital form is received by the broadcasting signal receiver and automatically specify from a result of the examination the channel of the ground wave broadcasting signal of a digital form, and carrying, out the same to examine at which frequency in the full range the ground wave broadcasting signal of an analog form is received by the broadcasting signal receiver and automatically specify from a result of the examination the channel of the ground wave broadcasting signal of an analog form.

10. A digital/analog TV receiver arranged in which the process of full-range scanning over the channel signal can be performed at high speed according to claim 9, wherein the controller is adapted for skipping the ground wave analog broadcast channel examining step for the channel of the broadcasting signal which has been specified of a digital form in the ground wave digital broadcast channel examining step.

11. A digital/analog TV receiver arranged in which the process of full-range scanning over the channel signal can be performed at high speed according to claim 9, wherein the controller is adapted for carrying out a step of picking up data of the channel of the ground wave broadcasting signal of an analog form from a VCT carried in the ground wave digital broadcasting signal during the ground wave digital broadcast channel examining step, and skipping the ground wave analog broadcast channel examining step for the channel of the broadcasting signal of an analog form of which the data has been picked up from the VCT carried in the ground wave digital broadcasting signal during the ground wave digital broadcast channel examining step.

12. A digital/analog TV receiver arranged in which the process of full-range scanning over the channel signal can be performed at high speed according to claim 9, wherein the controller is adapted for carrying out a step of picking up data of the channel of the ground wave broadcasting signal of an analog form from a VCT carried in the ground wave digital broadcasting signal during the ground wave digital broadcast channel examining step, and skipping the ground wave analog broadcast channel examining step for the channel of the broadcasting signal of a digital form which has been specified at the ground wave digital broadcast channel examining step and for the channel of the ground wave broadcasting signal of an analog form of which the data has been picked up from the VCT carried in the ground wave digital broadcasting signal during the ground wave digital broadcast channel examining step.

13. A digital/analog TV receiver arranged in which the process of full-range scanning over the channel signal can be performed at high speed according to claim 8, wherein the controller is adapted for when it is judged at the transmission route examining step that the broadcasting signal is received from the cable wave transmission route, carrying out the channel examining step to examine at which frequency in the full range an analog broadcasting signal of the cable wave is received by the broadcasting signal receiver and automatically specify from a result of the examination the channel of the cable wave analog broadcasting signal.

* * * * *